(12) United States Patent
Ito et al.

(10) Patent No.: US 9,118,823 B2
(45) Date of Patent: Aug. 25, 2015

(54) IMAGE GENERATION APPARATUS, IMAGE GENERATION METHOD AND STORAGE MEDIUM FOR GENERATING A TARGET IMAGE BASED ON A DIFFERENCE BETWEEN A GRIP-STATE IMAGE AND A NON-GRIP-STATE IMAGE

(75) Inventors: Yoshinori Ito, Tokyo (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 747 days.

(21) Appl. No.: 13/290,263

(22) Filed: Nov. 7, 2011

(65) Prior Publication Data

US 2012/0113268 A1 May 10, 2012

(30) Foreign Application Priority Data

Nov. 10, 2010 (JP) ................................ 2010-252208

(51) Int. Cl.
*H04N 5/222* (2006.01)
*G06T 19/20* (2011.01)
*B25J 9/16* (2006.01)
*H04N 5/225* (2006.01)

(52) U.S. Cl.
CPC ........... *H04N 5/2251* (2013.01); *H04N 5/2226* (2013.01); *B25J 9/16* (2013.01); *G06T 19/20* (2013.01)

(58) Field of Classification Search
CPC ..................................... B25J 9/16; H04N 5/22
See application file for complete search history.

(56) References Cited

U.S. PATENT DOCUMENTS

| | | |
|---|---|---|
| 5,596,426 A | 1/1997 | Ueno et al. |
| 5,629,781 A | 5/1997 | Ueno et al. |
| 6,034,787 A | 3/2000 | Hashimoto et al. |
| 6,621,921 B1 | 9/2003 | Matsugu et al. |
| 7,007,002 B2 | 2/2006 | Matsugu et al. |

(Continued)

FOREIGN PATENT DOCUMENTS

| | | |
|---|---|---|
| JP | 9-237340 A | 9/1997 |
| JP | 10-63324 A | 3/1998 |

(Continued)

OTHER PUBLICATIONS

Japanese Office Action dated Jul. 28, 2014, issued in counterpart Japanese Application No. 2010-252208.

*Primary Examiner* — Joseph Ustaris
*Assistant Examiner* — Mikhail Itskovich
(74) *Attorney, Agent, or Firm* — Fitzpatrick, Cella, Harper & Scinto

(57) ABSTRACT

An image generation apparatus comprises: a first-image obtaining unit adapted to obtain an image obtained by causing an image capturing unit to capture the grip unit controlled so as to place the target object in one predetermined orientation of a plurality of predetermined orientations with respect to the image capturing unit and the target object in the one predetermined orientation as a grip-state image; a second-image obtaining unit adapted to obtain, as a non-grip-state image corresponding to the one predetermined orientation, an image of the grip unit that does not grip the target object and is placed in a predetermined orientation coincident with the orientation controlled to place the target object in the one predetermined orientation; and an image generation unit adapted to generate a target object image including only the target object for the one predetermined orientation based on a difference between the grip-state image and the non-grip-state image.

12 Claims, 15 Drawing Sheets

(56) References Cited

U.S. PATENT DOCUMENTS

| | | |
|---|---|---|
| 7,200,260 B1 | 4/2007 | Watanabe et al. |
| 7,548,333 B2 | 6/2009 | Tokura et al. |
| 8,761,440 B2 | 6/2014 | Honjo et al. |
| 2001/0005204 A1* | 6/2001 | Matsumoto et al. .......... 345/418 |
| 2006/0078224 A1* | 4/2006 | Hirosawa ...................... 382/284 |
| 2012/0155706 A1 | 6/2012 | Honjo et al. |

FOREIGN PATENT DOCUMENTS

| | | |
|---|---|---|
| JP | 11-53547 A | 2/1999 |
| JP | 2000-288968 A | 10/2000 |
| JP | 2001-283216 A | 10/2001 |
| JP | 2004-226197 A | 8/2004 |
| JP | 2005-1022 A | 1/2005 |

* cited by examiner

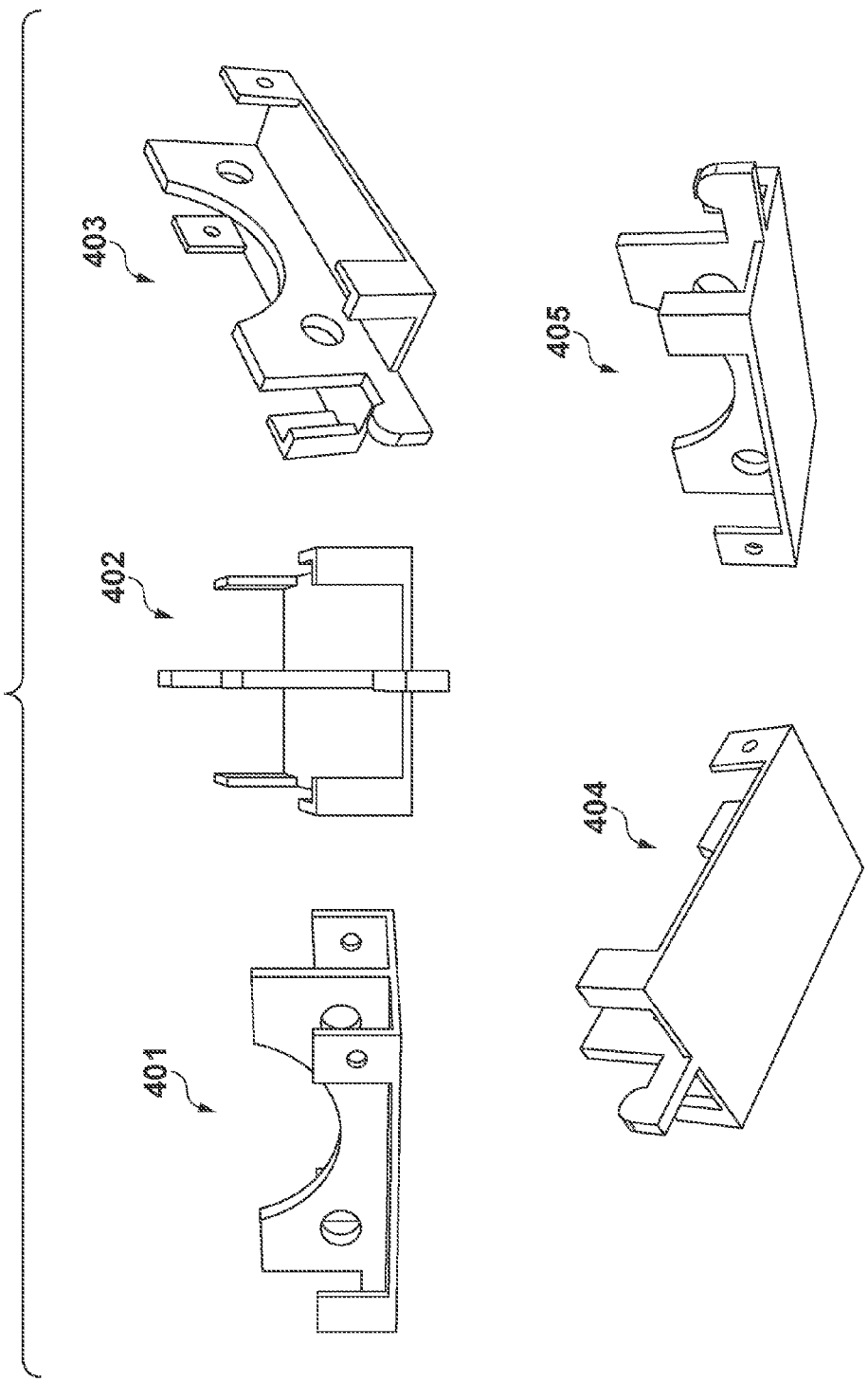

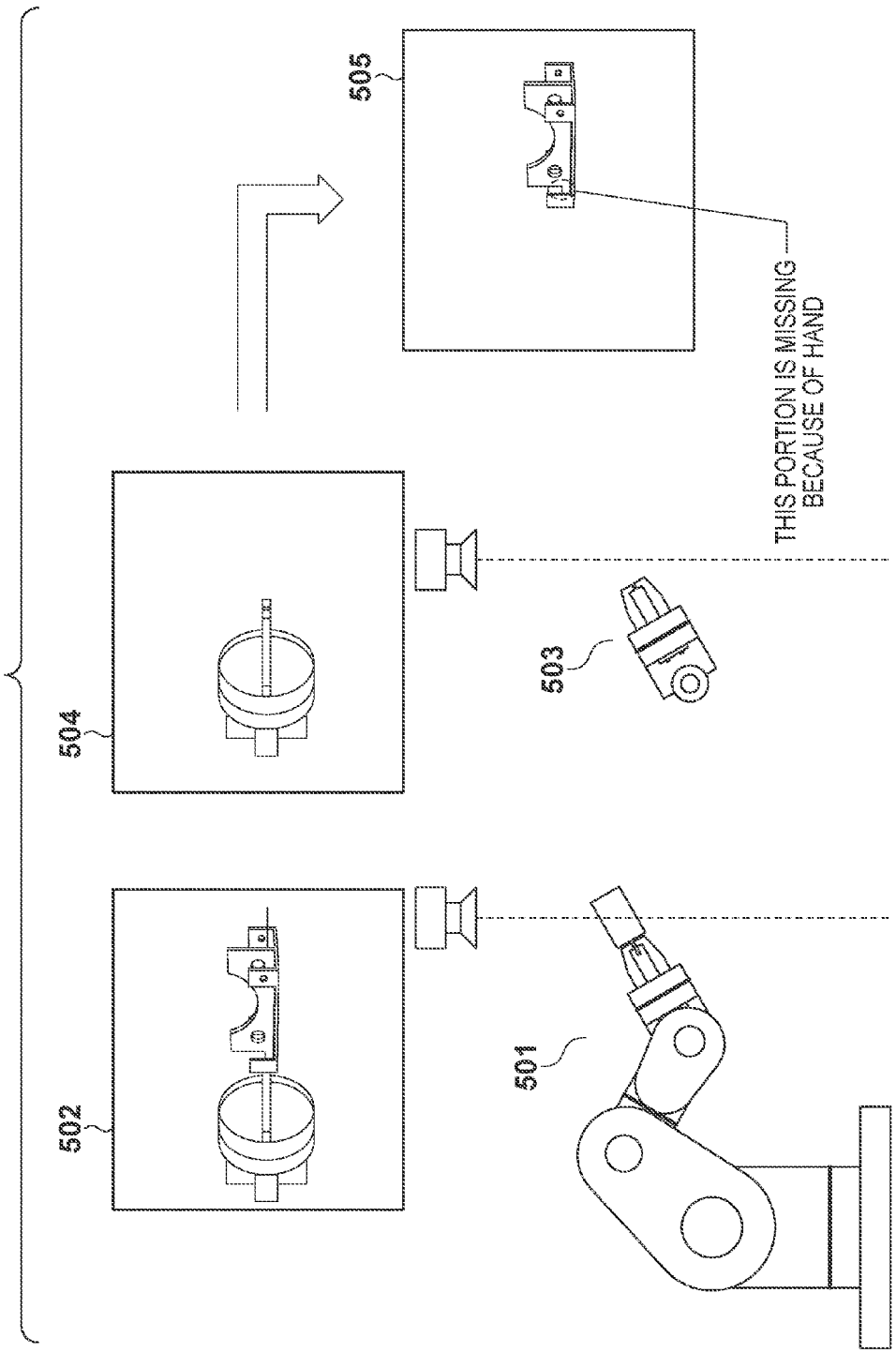

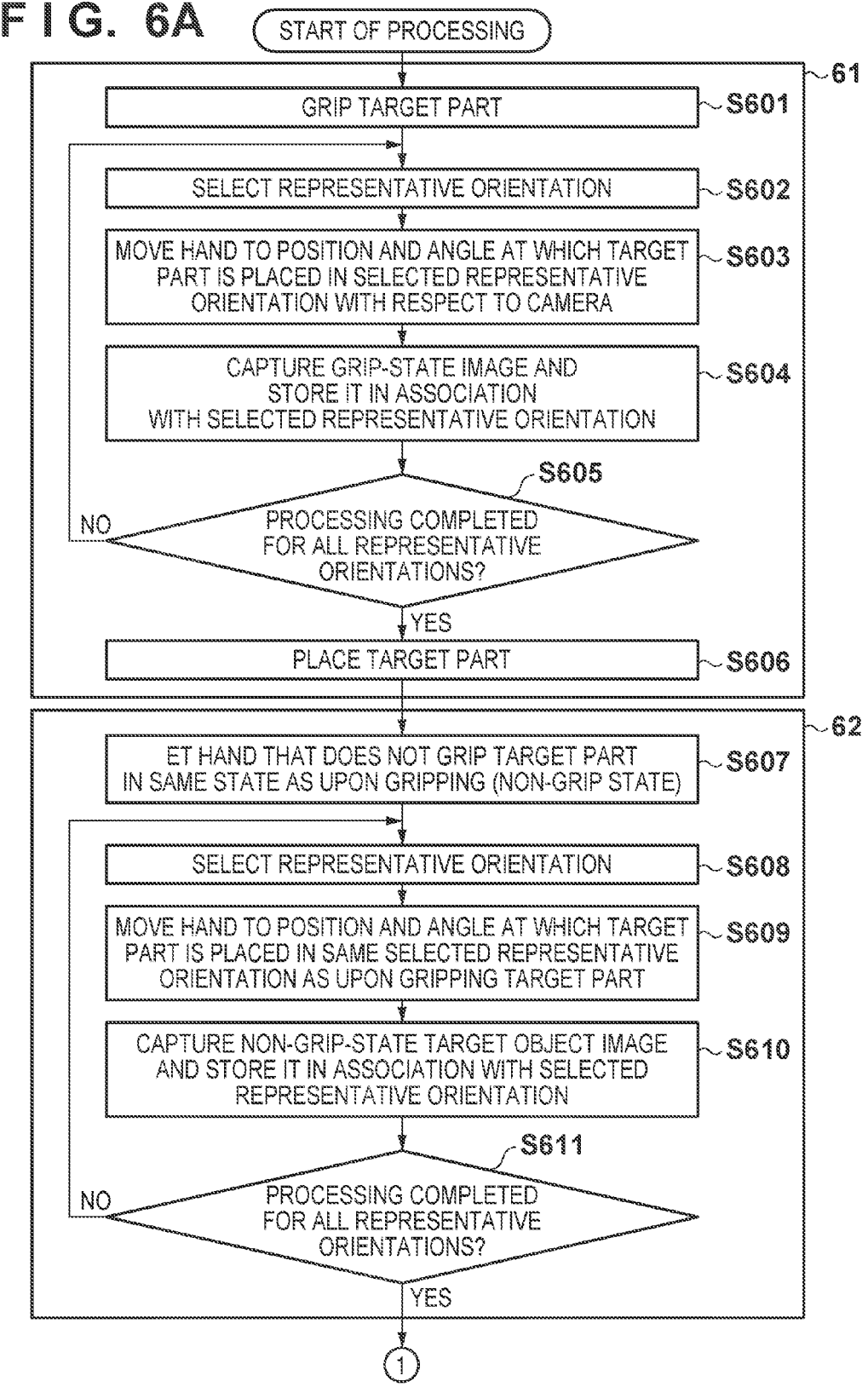

F I G. 12

| REPRESENTATIVE ORIENTATION Index | SHAFT 1 | SHAFT 2 | SHAFT 3 | SHAFT 4 | SHAFT 5 | SHAFT 6 |
|---|---|---|---|---|---|---|
| REFERENCE OFFSET (0) | 127 | 43 | 331 | 98 | 103 | 183 |
| 1 | 0 | 0 | 0 | 0 | 0 | +5 |
| 2 | 0 | 0 | 0 | 0 | 0 | +10 |
| ⋮ | | | | | | |
| N | 0 | 0 | 0 | −7 | +3 | −5 |
| N+1 | 0 | 0 | 0 | −7 | +3 | −10 |
| ⋮ | | | | | | |
| M | +4 | +2 | −13 | −14 | −9 | 0 |
| ⋮ | | | | | | |
| 129 | −6 | −7 | −8 | −13 | −21 | −105 |

IMAGE GENERATION APPARATUS, IMAGE GENERATION METHOD AND STORAGE MEDIUM FOR GENERATING A TARGET IMAGE BASED ON A DIFFERENCE BETWEEN A GRIP-STATE IMAGE AND A NON-GRIP-STATE IMAGE

BACKGROUND OF THE INVENTION

1. Field of the Invention

The present invention relates to an image generation apparatus, an image generation method, and a storage medium and, more particularly, to an image generation apparatus that generates an orientation-specific image of a target object, an image generation method, and a storage medium.

2. Description of the Related Art

In a production site, a robot arm having a hand mechanism for gripping a target object is used to, for example, assemble a product or convey a part. An image capturing apparatus such as a camera has recently been introduced as the "eye" of a robot system that controls such a robot arm. An image captured by the image capturing apparatus is used to, for example, do pattern recognition processing and specify the position of a target part to be gripped by the hand or conduct visual inspection to check whether the target part has a defect.

As for parts to be handled by such a robot system, conventionally, a plurality of parts are often regularly arranged on an array pallet and handled. If the parts line up, they are guaranteed to have a predetermined orientation. For this reason, specifying only the position of each part by relatively simple pattern recognition processing allows the hand to grip the parts. However, to arrange the parts on the array pallet in advance, a manual operation or a dedicated machine for line-up is necessary, leading to higher cost.

Hence, there is a growing demand for causing a hand mechanism attached to an arm with a high degree of freedom to directly grip a target part out of a number of parts in a "pile-up state", that is, parts that simply pile up on a tray in various orientations. To do this control, it is necessary to sense the tray in the "pile-up state" and estimate not only the position but also the orientation (direction) of the target part as accurately as possible.

A household robot that has recently been developed for the entertainment, household assist, care applications or the like needs to identify various objects in a daily space and cause the hand to grip a target object as needed. For this purpose, it is important to not only know the position but also the orientation (direction) of the target object, as in the above-described production robot system.

To estimate the orientation of the target object from a captured image, teaching data is necessary in general, which makes the system learn target object orientations to be used for pattern recognition processing. As the teaching data, for example, orientation-specific target object images are used, which are obtained by capturing the target object in several representative orientations (orientations relative to the image capturing apparatus, which will be referred to as "representative orientations" hereinafter) when viewed from every direction so as to spherically envelope the target object.

To reproduce accurate representative orientations, target object images to be used as the teaching data are often generated in advance using a dedicated teaching data generation apparatus.

However, the teaching data generation apparatus is shared by a plurality of apparatuses from the viewpoint of the space, cost, and the like, and therefore often installed in a place different from the site where the above-described robot system is used. For this reason, it is very difficult to make illumination and the image capturing conditions of the image capturing apparatus and the like match those used in the robot system on site. That is, the degree of coincidence between the teaching data of the target object and image data captured on site decreases although they should have the same orientation, resulting in lower orientation estimation accuracy. In addition, introducing the dedicated teaching data generation apparatus leads to an increase in the cost.

Several methods of generating teaching data using the robot system itself, which is used on site have been proposed, in place of the dedicated teaching data generation apparatus.

For example, in Japanese Patent Laid-Open No. 2005-1022, using a visual sensor for obtaining and outputting 3D data, the 3D data of a target object gripped by the hand is obtained, thereby extracting a feature with hand associated with the shape.

A portion corresponding to the hand is removed from the feature with hand based on the position and orientation of the hand and a hand model created and stored in advance, thereby outputting a feature without hand. This data is registered as an object model. If there is an already registered object model of the same target object, it is updated by overlapping the newly obtained object model.

When obtaining teaching data for orientation estimation by capturing an image of a target object gripped by the hand mechanism while changing its orientation, as in the above-described related art, not only the target object but also (at least part of) the hand mechanism is included in the captured image. If this image is directly used as the learning image, the originally unnecessary image feature of the hand mechanism is learned together. It is therefore difficult to estimate the accurate orientation only from the image of the target object on the tray.

As described above, one of the merits of the method is that the teaching data can be generated under the same image capturing conditions (ambient light and image capturing apparatus) as those of the environment in actual use. However, especially the ambient light does not always guarantee a predetermined condition and may change in a day. At this time, the orientation estimation accuracy lowers.

In Japanese Patent Laid-Open No. 2005-1022 described above, the feature corresponding to the hand portion is removed. However, the visual sensor capable of obtaining 3D data needs to be used. Also required is doing cumbersome calculation of, for example, holding a hand model in advance and converting a feature obtained from obtained 3D data to a hand coordinate system. Moreover, there is no countermeasure taken against the change in the ambient light.

In consideration of one of the above-described problems, the present invention provides a technique of generating image data including only a target object by removing unnecessary portions such as a hand by simple processing from a 2D image obtained by capturing the target object gripped by a hand mechanism while changing its orientation.

SUMMARY OF THE INVENTION

According to one aspect of the present invention, there is provided an image generation apparatus comprising: a grip unit adapted to grip a target object; an image capturing unit adapted to capture an image of at least one of the target object and the grip unit; a control unit adapted to control an orientation of the grip unit; a first image obtaining unit adapted to obtain an image obtained by causing the image capturing unit to capture the grip unit controlled by the control unit so as to place the target object in one predetermined orientation of a plurality of predetermined orientations with respect to the image capturing unit and the target object in the one predetermined orientation as a grip-state image corresponding to the one predetermined orientation; a second image obtaining unit adapted to obtain, as a non-grip-state image corresponding to the one predetermined orientation, an image of the grip unit that does not grip the target object and is placed in a predetermined orientation coincident with the orientation controlled to place the target object in the one predetermined orientation; and an image generation unit adapted to generate a target object image including only the target object for the one predetermined orientation based on a difference between the grip-state image and the non-grip-state image corresponding to the one predetermined orientation.

According to another aspect of the present invention, there is provided an image generation method of an image generation apparatus including a grip unit and an image capturing unit, comprising: causing the grip unit to grip a target object; causing the image capturing unit to capture an image of at least one of the target object and the grip unit; obtaining an image obtained by causing the image capturing unit to capture the grip unit controlled so as to place the target object in one predetermined orientation of a plurality of predetermined orientations with respect to the image capturing unit and the target object in the one predetermined orientation as a grip-state image corresponding to the one predetermined orientation; obtaining, as a non-grip-state image corresponding to the one predetermined orientation, an image of the grip unit that does not grip the target object and is placed in a predetermined orientation coincident with the orientation controlled to place the target object in the one predetermined orientation; and generating a target object image including only the target object for the one predetermined orientation based on a difference between the grip-state image and the non-grip-state image corresponding to the one predetermined orientation.

Further features of the present invention will be apparent from the following description of exemplary embodiments with reference to the attached drawings.

BRIEF DESCRIPTION OF THE DRAWINGS

FIG. 4 is a view showing examples of the representative orientation of the target object;

FIG. 5 is a view for explaining an example of orientation-specific target object image generation processing;

FIGS. 6A and 6B are flowcharts illustrating the procedure of orientation-specific target object image generation processing;

FIG. 12 is a table showing control values to be used to reproduce the representative orientations;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
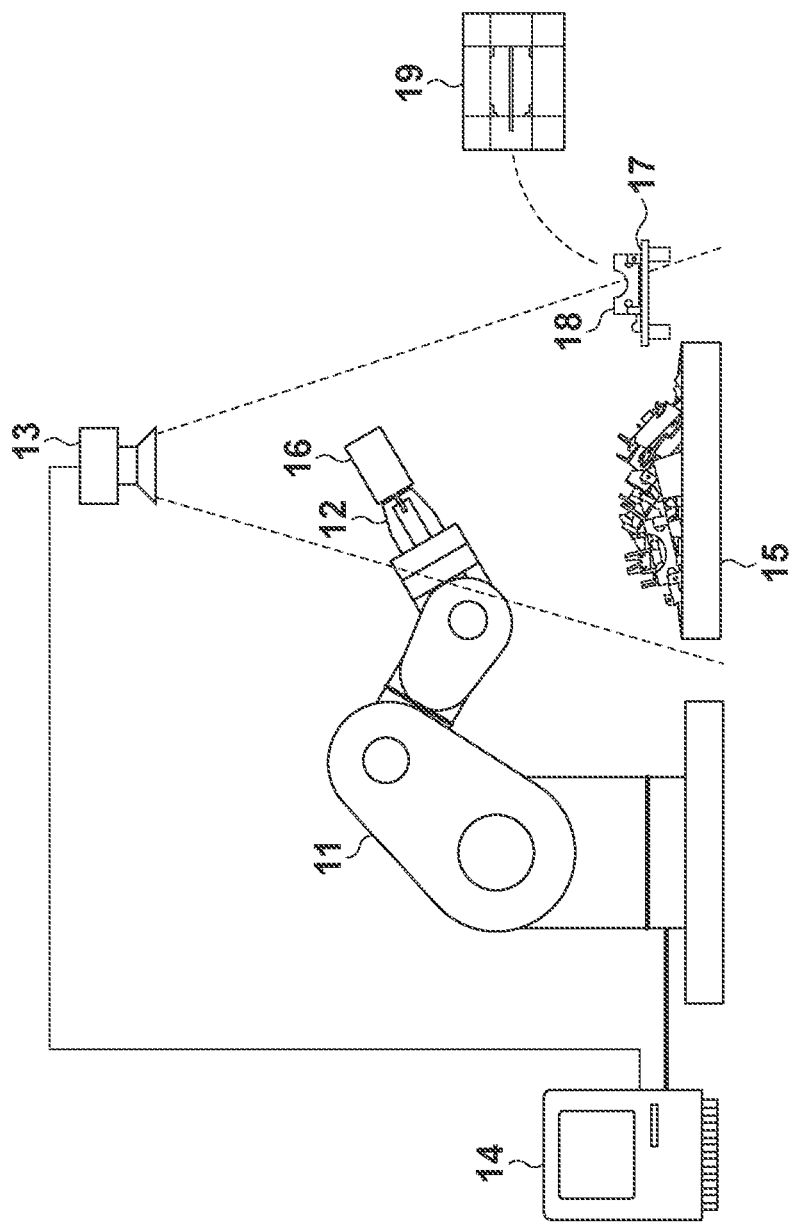
FIG. 1 is a view showing an example of a target object grip system.

The arrangement of a robot system (target object grip system) according to this embodiment will be described with reference to FIG. 1.

The robot system includes a robot arm 11, an image capturing apparatus 13, and a controller 14. The robot arm 11 is a six-degree-of-freedom arm and includes a two-fingered hand mechanism (to be referred to as a "hand 12" hereinafter) as the end effector. FIG. 1 illustrates a state in which the hand 12 grips one of parts 16 that are grip target objects. A number of parts 16 before the grip pile up on a parts tray 15.

The image capturing apparatus 13 is formed from, for example, a camera. In this embodiment, the camera 13 is permanently attached to the ceiling or the upper frame (not shown) of the system so as to be able to capture at least the overall region of the parts tray and generate image data. The controller 14 controls various operations by controlling the robot arm 11, the hand 12, and the image capturing apparatus 13. The controller 14 is generally formed from a computer. In this embodiment, however, the arrangement is not particularly limited. The parts tray 15 has a number of parts 16 placed on it.

A sample placement table 17 is used to place a sample part 18. That is, the sample placement table 17 functions as a known orientation target object holding unit. The sample part 18 is an equivalent to the part 16 and is prepared solely for learning image generation. The sample placement table 17 has markers to accurately place the sample part 18 in a predetermined orientation. To easily place the sample part 18 on the sample placement table 17, a measure such as forming grooves may be taken, as needed. That is, the sample part 18 placed on the sample placement table 17 has a known orientation in the robot system. A plan view 19 illustrates the sample placement table 17 with the placed sample part 18 viewed from the upper side.

Note that the sample placement table 17 need not always be installed within the image capturing range of the image capturing apparatus 13. It is necessary to only arrange the sample placement table 17 not to interfere with the robot system in the steady use state (to be referred to as an "online state" hereinafter) such that the grippable portion of the placed sample part 18 is arranged within the grippable range of the hand 12. The place where the sample placement table 17 is placed is accurately input to the controller 14 in advance. This allows the robot system to grip the sample part 18 in the known orientation as needed.

Figure 2:
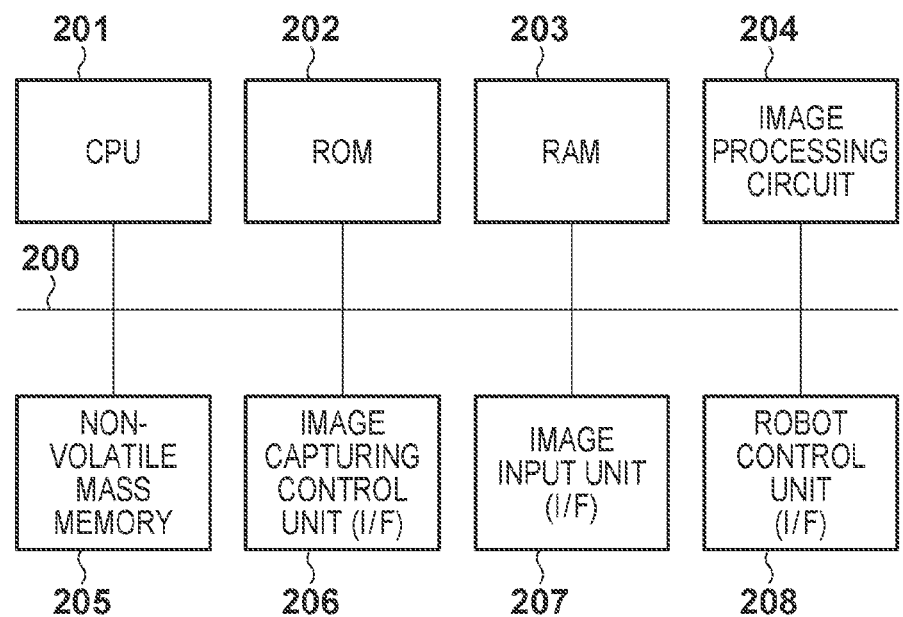
FIG. 2 is a block diagram showing an example of the controller of the target object grip system.

FIG. 2 is a block diagram showing an example of the schematic arrangement of the controller 14. A CPU 201, a ROM 202, a RAM 203, an image processing circuit 204, a nonvolatile mass memory 205, an image capturing control unit (I/F) 206, an image input unit (I/F) 207, and a robot control unit (I/F) 208 are connected to a bus 200. The ROM 202 stores the boot program, constant parameters, and the like of the CPU 201. The RAM 203 is used as the work area of the CPU 201 or a storage area to temporarily store an image generated by processing an image captured by the image capturing apparatus 13 or another image.

The image processing circuit 204 is a dedicated hardware circuit that performs learning image generation processing to be described later, an orientation pattern detection processing of estimating the position and orientation of a target object from an image obtained by capturing the pile-up tray, and at least part of preprocessing necessary for these processes. Note that the system may be configured to execute all image processing operations based on a program operated by the CPU 201, instead of particularly providing the image processing circuit 204. This normally enables to reduce the cost but slows down the processing.

The nonvolatile mass memory 205 is formed from, for example, an HDD and stores programs to be operated by the CPU 201, system parameters, and a generated target object image, as will be described later.

The image capturing control unit 206 includes a dedicated I/F connected to the image capturing apparatus 13 to perform image capturing control such as image capturing timing notification.

The image input unit 207 is connected to the output unit (not shown) of the controller 14 to input captured image data to the controller.

The robot control unit 208 includes an I/F connected to the robot arm 11 and the two-fingered hand mechanism 12 to perform desired operation control.

A target object image that is generated using the robot system and is usable as a learning image to be used for orientation pattern detection processing will be explained next. To cause the hand 12 to selectively grip one of the target parts 16 piling up on the tray 15, it is necessary to specify the position and orientation, that is, the three-axis rotation directions (roll angle, pitch angle, and yaw angle) of the part 16 in a 3D space. In this robot system, the position and orientation of a part relative to the image capturing apparatus 13 are estimated based on a 2D image captured by the image capturing apparatus 13 and finally converted into a robot coordinate system, thereby performing grip control calculation.

That is, images obtained by capturing the part 16 from every direction so as to spherically envelope the part are stored in association with orientation information and used as the teaching data. In fact, since it is impossible to prepare the images by continuously capturing the part from all directions, only images of representative orientations sampled at some granularity are captured.

Figure 3:
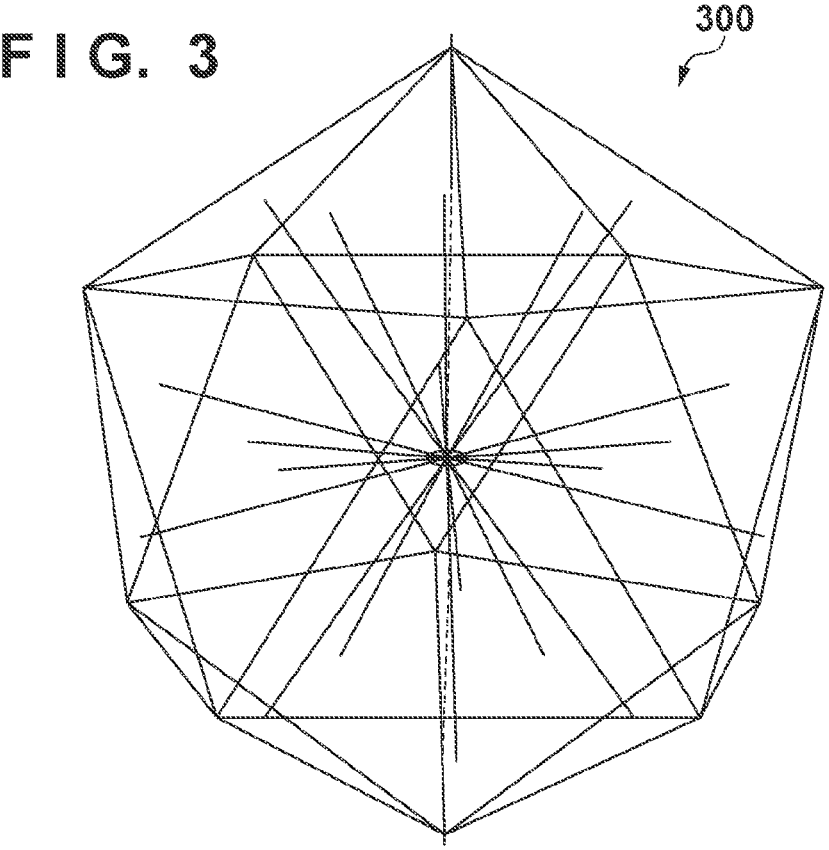
FIG. 3 is a view for explaining a geodetic dome.

FIG. 3 is a view for explaining representative orientations, illustrating a concept called a geodetic dome 300. In this embodiment, the geodetic dome 300 is based on a regular icosahedron. When a part is arranged at the center of the geodetic dome, a direction viewed from a representative point on the regular icosahedron is defined as a representative orientation. As the representative points, for example, the apexes, the center points of the planes, and the like can be used. Since the regular icosahedron has 16 apexes and 20 planes, a total of 36 orientations can be defined.

In many cases, however, the granularity is not enough to grip. Hence, the number of apexes is increased by dividing each equilateral triangle plane. For example, when each side of each plane is divided into two parts, one equilateral triangle of each plane is divided into four small equilateral triangles.

The number of planes increases by four times, and the number of apexes increases by 34 corresponding to the original number of sides. Hence, if the apexes and the plane centers are used as the representative points, 130 representative orientations can be defined.

FIG. 4 illustrates the part 16 in several representative orientations 401 to 405. When piling up, the part 16 can orient in every direction with respect to the image capturing apparatus 13. It is difficult for, for example, a flat part to take some orientations, as a matter of course. In this case, the orientations can be excluded from learning images.

The outline of processing of generating a learning image corresponding to each representative orientation will be described next with reference to FIG. 5. A grip state 501 indicates an example in which the hand 12 has gripped the sample part 18 on the sample placement table 17 and moved it to a predetermined orientation relative to the image capturing apparatus 13. In this case, the representative orientation 401 in FIG. 4 is an example of the predetermined orientation. The sample part 18 on the sample placement table 17 is known, as described above. The controller 14 holds the 3D model data of the target part in the nonvolatile memory 205. The grip position for the hand 12 is designated in advance in the model data. Based on this data, the arm 11 and the hand 12 can be controlled to grip the sample part 18 on the sample placement table 17. The rotation angle of each joint shaft of the arm 11 is calculated based on the known orientation, thereby moving the sample part 18 to the desired orientation with respect to the image capturing apparatus 13.

At this time, an image 502 is captured. The image also includes the hand portion gripping the sample part 18 and the background (not shown) other than the hand and the arm portion, as a matter of course. This image will be referred to as a grip-state image in the representative orientation 401 of FIG. 4.

Next, the sample part 18 is returned to the sample placement table 17. Then, the hand 12 is moved again to the same position and angle as those upon capturing the grip-state image in the representative orientation 401 of FIG. 4. A grip state 503 indicates this state. At this time, the hand 12 that is not gripping the sample part 18 opens the fingers precisely in the same way as in the grip state.

An image 504 is captured in this state. This image will be referred to as a non-grip-state image in the representative orientation 401. The region except the place where the part exists, including not only the background but also the portion of the hand (and the arm, if included), is almost the same between the grip-state image 502 and the non-grip-state image 504 in the representative orientation 401. The pixel difference between the images is calculated. A pixel mask is generated to leave only pixels for which the absolute value of the difference is equal to or larger than a predetermined threshold. When this mask is applied to the grip-state image 502, a target object image including only the sample part 18 without the hand 12 can be obtained. A value $m_{xy}$ corresponding to each pixel position (x,y) of the pixel mask is given by $$m_{xy} = \begin{cases} 1 (d_{xy} \geq T_m) \\ 0 (d_{xy} < T_m) \end{cases} \quad (1)$$

where $d_{xy}$ is determined by $$d_{xy} = \text{abs}(I_{h\_xy} - I_{e\_xy}) \quad (2)$$

where $I_{h\_xy}$ is the luminance value at each pixel position (x,y) in the grip-state image 502, $I_{e\_xy}$ is the luminance value in the non-grip-state image 504, and $T_m$ is a predetermined threshold.

The thus generated image of the target object in the representative orientation 401 is illustrated as a target object image 505. Each pixel value $I_{o\_xy}$ of the target object image 505 is given by $$I_{o\_xy} = m_{xy} \cdot I_{h\_xy} \qquad (3)$$

In this way, the non-grip-state image including the hand, which changes depending on the orientation, is used as the base image to obtain the difference. This allows the removal of not only the background but also the hand portion and generates a learning image including only the part.

In this system, the unnecessary pixel removal processing is done by high-speed calculation processing using the image processing circuit 204 under the control of the CPU 201 in FIG. 2. The image obtained by the processing is temporarily held in the RAM 203 and stored in the mass memory 205 as needed.

Note that in the learning image obtained in the above-described way, a partial region of the sample part 18 hidden behind the finger of the hand 12 when viewed from the image capturing apparatus 13 is missing, as shown by the target object image 505. In some representative orientations or part shapes, the missing portion may be so large that the image is not suitable for the learning image. In such a case, the learning image is similarly generated by gripping another portion of the sample part 18 and driving the arm 11 to move the sample part to the same representative orientation. Alternatively, a plurality of images may be generated by gripping a plurality of different portions in a single representative orientation, and composited to generate one learning image with the missing portion made up, as a matter of course. The sample part 18 is placed in a known orientation on the sample placement table 17. For this reason, it is possible to grip a desired portion by calculation based on the part model. Even when gripped at different portions, the part 18 can be moved to the same position and orientation with respect to the image capturing apparatus 13. Hence, the plurality of images with the same orientation and different grip positions can be composited only by exclusively ORing the pixels. That is, the composition can be implemented by very simple processing. The exclusive OR processing on the pixel basis is also performed using the image processing circuit 204.

Figure 6B:
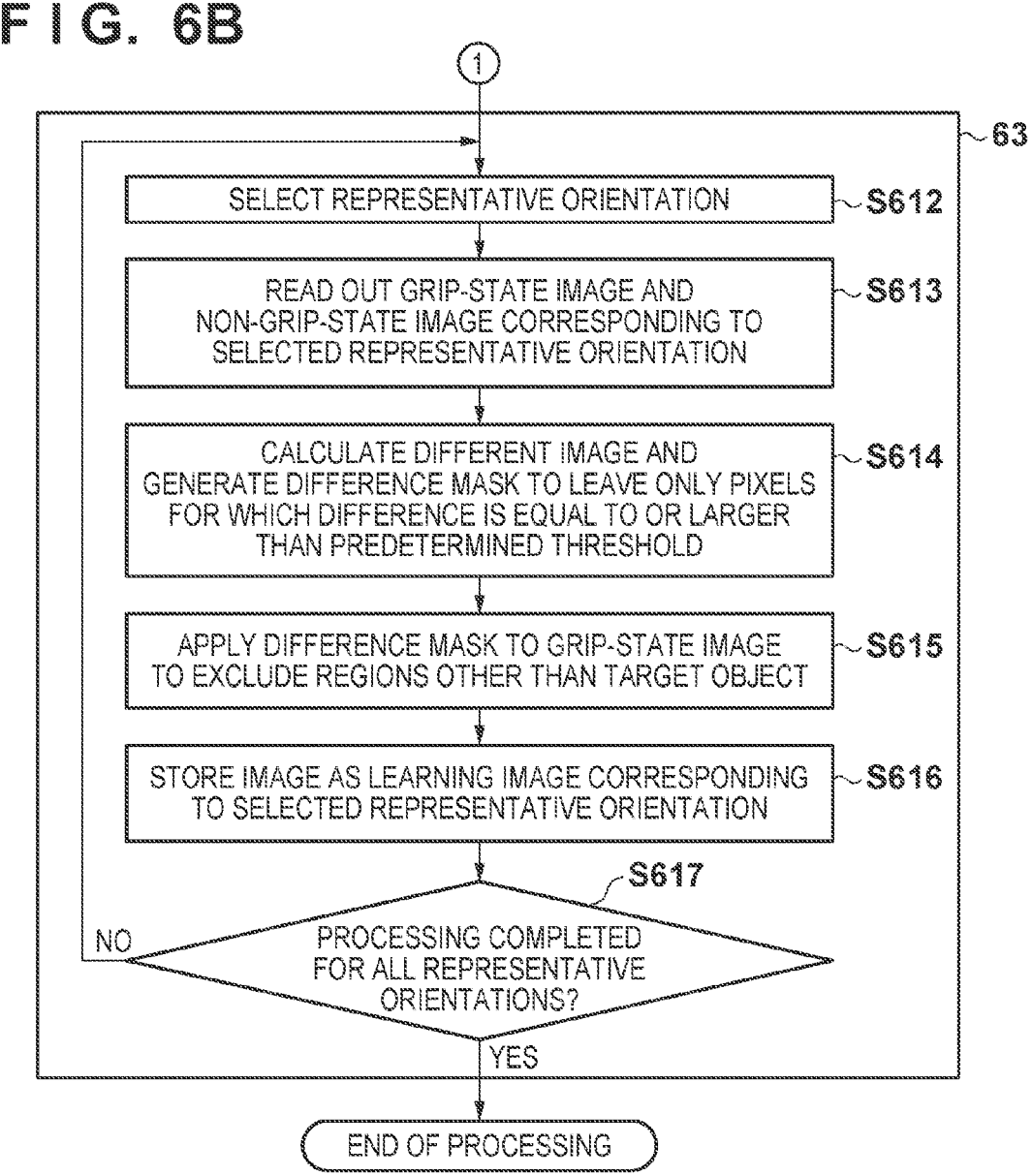

FIGS. 6A and 6B are flowcharts illustrating the procedure of basic processing for obtaining an orientation-specific target object image. The processing includes processing blocks 61, 62, and 63. The processing block 61 represents processing of obtaining a grip-state image corresponding to each representative orientation. First in step S601, the hand 12 grips the sample target part 18. The sample target part 18 is placed in a known orientation on the sample placement table 17, as described above. Hence, the controller 14 can calculate the driving angle of each shaft of the robot arm 11 to grip the grip designated portion of the sample part 18. With this control, the hand 12 can grip the sample part 18.

In step S602, the controller 14 selects one of several representative orientations. In this embodiment, the above-described geodetic dome 300 formed from a regular icosahedron with each plane divided into four parts assumes to set 130 representative orientations. That is, the representative orientations are given Index numbers 0 to 129. The representative orientation Indices are selected one by one sequentially from 0.

Control values to be used to reproduce the representative orientations are held in the nonvolatile memory 205 as a table having the format shown in FIG. 12. In this table, the first column shows the representative orientation Indices (the representative orientation Indices can be omitted because they are continuously stored on the actual memory image). The second to seventh columns show the rotation driving amounts of the shafts of the robot arm. On the other hand, the first row shows the absolute rotation driving amounts of the shafts to be used to reproduce the reference orientation of the part 16 at a predetermined position on the image capturing optical axis of the image capturing apparatus 13. The second and subsequent columns show the relative rotation driving amounts of the shafts to be used to change the reference orientation to other representative orientations. The reference orientation is the orientation on the sample placement table 17 which is directly translated to the predetermined position on the image capturing optical axis. The rotation driving amounts are calculated in advance based on the models of the 130 viewpoints, the robot arm system, and the target part.

In step S603, the controller 14 controls to rotatably drive the shafts of the robot arm 11 based on the table of FIG. 12 so that the sample target part 18 gripped by the hand 12 is placed in the representative orientation selected in step S602.

Figure 13A:
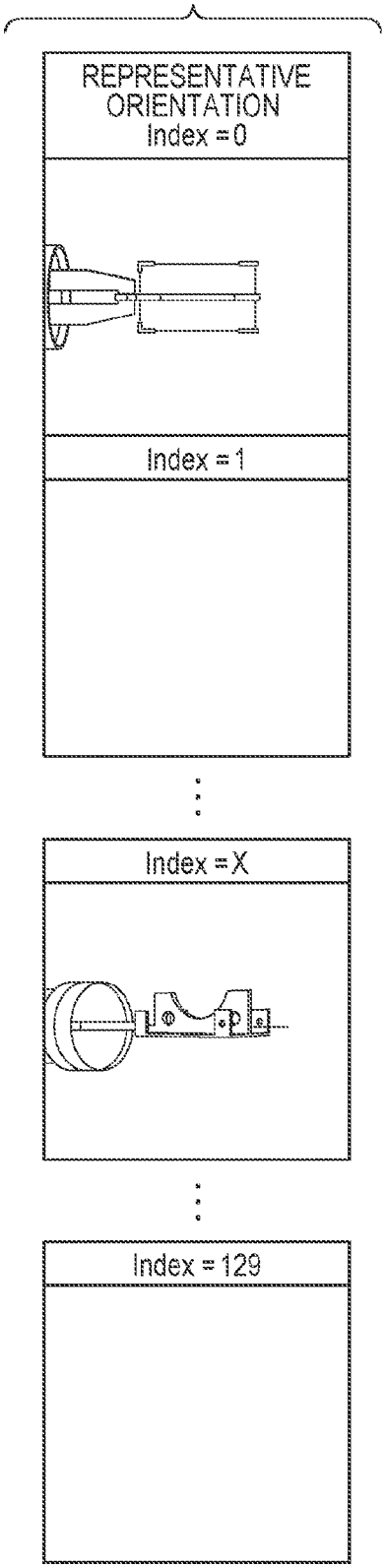
FIG. 13A is a view showing the memory image of a grip-state image stored in a nonvolatile mass memory.

In step S604, the image capturing apparatus 13 captures the sample target part 18 in the representative orientation selected in step S602 together with the hand 12 to obtain a grip-state image. The obtained grip-state image is stored in the RAM 203 or the nonvolatile mass memory 205 in association with the Index of the selected representative orientation. FIG. 13A shows the memory image of grip-state images held in the mass memory 205. Image data corresponding to the representative orientation Indices are held as the bitmap of luminance values. Note that when storing the image data corresponding to the representative orientation Indices in the order of Index, the Index values themselves need not be held. The image data may be compressed.

In step S605, the controller 14 determines whether processing for all 130 representative orientations is completed. Upon determining that processing for all representative orientations is completed (YES in step S605), the process advances to step S606. Upon determining that processing for all representative orientations is not completed (NO in step S605), the process returns to step S602.

In step S606, the controller 14 controls the arm 11 and the hand 12 to return the sample target part 18 gripped by the hand 12 to the sample placement table 17. Processing in the processing block 61 thus ends.

The processing block 62 represents non-grip-state image obtaining processing.

First in step S607, the controller 14 controls the hand 12 to the same state as in the grip state without gripping the target part. More specifically, in this embodiment, the hand 12 opens the two fingers in the same way as upon gripping the sample target part 18.

In step S608, the controller 14 selects one of the 130 representative orientations. This processing is the same as in step S602.

In step S609, the controller 14 controls to move the hand 12 in the non-grip state based on the control values in the table of FIG. 12, as in step S603.

Figure 13B:
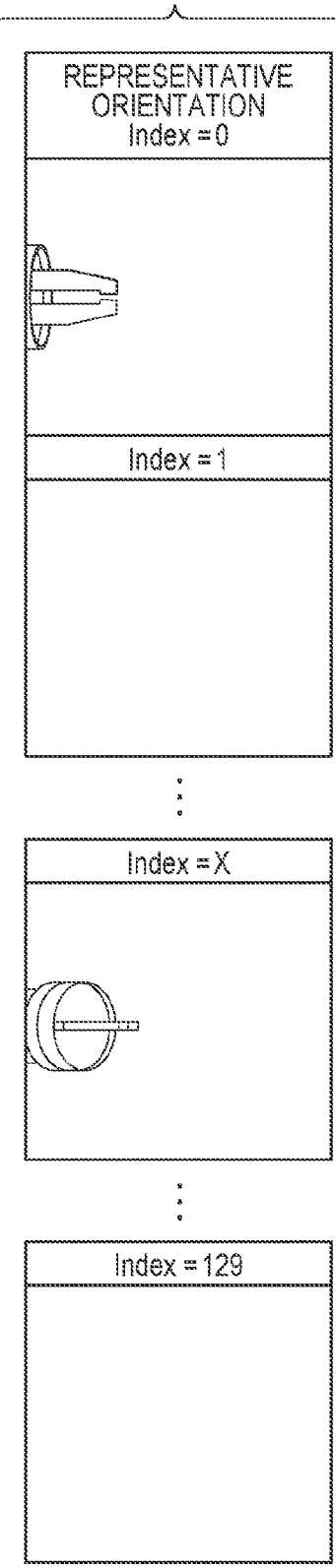
FIG. 13B is a view showing the memory image of a non-grip-state image stored in the nonvolatile mass memory in association with a representative orientation Index.

In step S610, the image capturing apparatus 13 captures the non-grip-state image including only the hand 12 and stores it in the nonvolatile mass memory 205 in association with the representative orientation selected in step S608. FIG. 13B shows the memory image of non-grip-state images stored in the nonvolatile mass memory 205 in association with the representative orientation Indices. In this embodiment, the non-grip-state images are held as the bitmap of luminance values, as in FIG. 13A.

In step S611, the controller 14 determines whether processing for all 130 representative orientations is completed, as in step S605. Upon determining that processing for all representative orientations is completed (YES in step S611), the process advances to step S612. Upon determining that processing for all representative orientations is not completed (NO in step S611), the process returns to step S608. Processing in the processing block 62 thus ends.

The processing block 63 represents processing of generating an orientation-specific target object image corresponding to each representative orientation.

In step S612, the controller 14 selects one of the 130 representative orientations, as in steps S602 and S608.

In step S613, the controller 14 reads out the grip-state image and the non-grip-state image stored in association with the representative orientation selected in step S612. That is, the controller 14 reads out image bitmap data corresponding to the selected representative orientation Index from each of FIGS. 13A and 13B.

In step S614, the controller 14 performs calculation corresponding to equation (1) to obtain the difference for each pixel of the images, thereby generating a difference mask. The difference mask is used to leave only pixels for which the difference value is equal to or larger than a predetermined value and exclude the remaining portions, as described above.

In step S615, the controller 14 performs calculation corresponding to equation (2) to apply the difference mask to the grip-state image, thereby removing pixels other than the pixels in which the target object itself exists.

In step S616, the controller 14 stores the target object image corresponding to the selected representative orientation in the nonvolatile mass memory 205.

In step S617, the controller 14 determines whether processing for all 130 representative orientations is completed, as in steps S605 and S611. Upon determining that processing for all representative orientations is completed (YES in step S617), the processing ends. Upon determining that processing for all representative orientations is not completed (NO in step S617), the process returns to step S612. Processing in the processing block 63 thus ends.

Using the target object image corresponding to each representative orientation obtained in the above-described way as a learning image makes it possible to cause an orientation pattern detector to learn using a learning algorithm like the parametric eigenspace method disclosed in, for example, Japanese Patent Laid-Open No. 9-237340. This allows the orientation pattern detector to specify the position of a part in an input image and simultaneously estimate whether the orientation is similar to a representative orientation.

Note that the processing described with reference to FIGS. 6A and 6B have a loop structure in which each of the 130 representative orientations is selected three times. However, similar processing can be done using another loop structure, as a matter of course. For example, adopting a loop structure in which each of the 130 representative orientations is selected once, the grip-state image obtaining processing, the non-grip-state image obtaining processing, and the processing of generating orientation-specific target object images corresponding to the representative orientations may be performed in one loop.

In this embodiment, the sample target part 18 is placed in a known orientation on the sample placement table 17 so that the hand 12 can grip it. However, another method may be used to cause the hand 12 to grip the sample target part. For example, the sample target part may be delivered by human hand. Alternatively, the user may manually operate the arm 11 and the hand 12 using a user I/F for the controller 14 to grip the sample target part 18 at a desired position.

The non-grip-state image need not always be captured together with the grip-state image. Instead, the non-grip-state image may be captured and stored in the nonvolatile mass memory 205 in advance. Storing non-grip-state images of the hand 12 in a plurality of non-grip states in accordance with the type of the target part allows support for a plurality of kinds of target parts.

Instead of image capturing, the non-grip-state image may be generated by CG composition using the shape models of the hand 12 and the arm 11. Although the CG-composited image may be different from the actually captured image, it is used only for difference mask generation. Since the portion left as the target object image is obtained from the actually captured grip-state image, the influence on the subsequent learning is relatively small.

In this embodiment, the captured grip-state image and non-grip-state image are directly used in difference processing. However, the same processing may be executed for feature amount extraction images obtained by performing some preprocessing such as edge extraction for the respective images.

This preprocessing can be the same as, for example, preprocessing to be performed in orientation pattern detection processing using the obtained target object images as the learning images. Alternatively, after the orientation-specific target object images are obtained, they may undergo feature amount extraction processing to store the target object images in the nonvolatile mass memory 205 as feature amount images.

In this embodiment, as predetermined orientations, 130 representative orientations are defined individually as rotation driving amounts on the control value table shown in FIG. 12. However, the method of defining the predetermined orientations is not limited to this. For example, control may be performed to continuously change the orientation all over the geodetic dome 300, and image capturing may be performed at a predetermined interval. The angle information value of each joint shaft of the robot arm 11 at the time of image capturing may be read out from, for example, a pulse encoder attached to each shaft, converted into an Index, and used as orientation information.

Instead of searching for a grip-state image and a non-grip-state image that are coincident based on an Index or an encoder value, image matching processing may be done to search for the images that match. At this time, at least the pixels of the hand portion match between the grip-state image and the non-grip-state image whose orientations match. For this reason, the coincidence is higher than in the case in which the orientations do not match. That is, the pixel values of the hand portion themselves can be used as the information representing the orientation. This information may be used together with an Index or an encoder value. When the orientation reproduction error of the robot is large, the information can be used as auxiliary information to correct the error.

Figure 7:
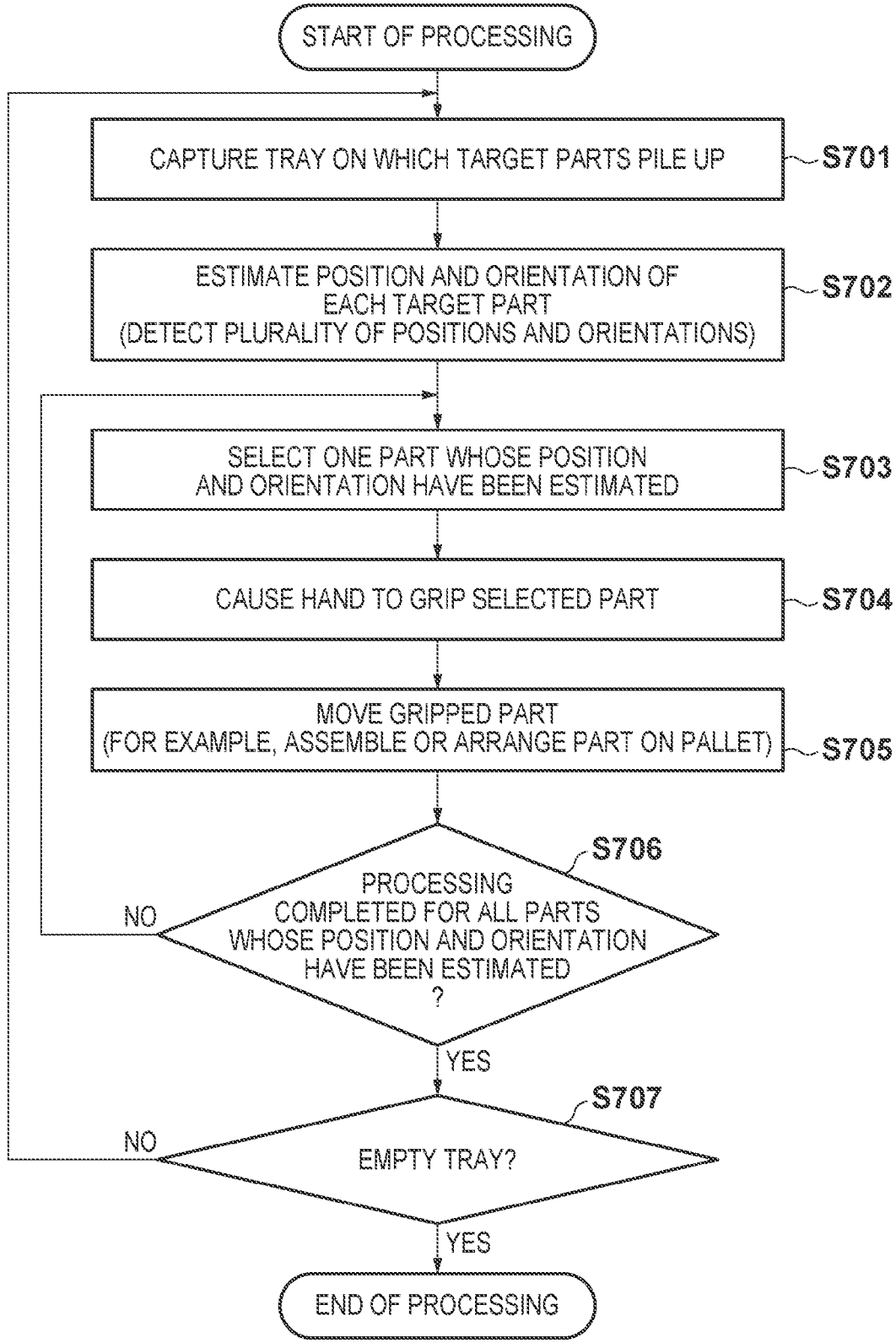
FIG. 7 is a flowchart illustrating the procedure of processing in the online state of a robot system.

Part picking processing according to this embodiment after the orientation pattern detector has learned using, as the learning images, the orientation-specific target object images obtained in the above-described way will be described with reference to FIG. 7. This is the steady use state of the robot system and is called an online state.

First in step S701, the image capturing apparatus 13 captures the parts tray 15 on which the target parts 16 pile up.

In step S702, using the orientation pattern detector that has already learned, the controller 14 estimates the position and orientation of each target part in the image of the parts tray 15 on which the target parts 16 pile up. The accurate position and orientation of a part that is present relatively on the lower side of the parts tray 15 cannot be estimated because it is partially or wholly hidden by the parts on the upper side. However, this poses no particular problem because the hand 12 normally picks up a part on the upper side of the parts tray 15. In this embodiment, the position in the depth direction of the image is estimated based on the size of the detected part in the image. The captured image to be input to the orientation pattern detector is converted using a plurality of scaling ratios in advance. Based on from which resized image (to be also referred to as a "pyramid image" hereinafter) the target part 16 has been detected, the size of the target part 16 in the image can be specified.

In step S703, the controller 14 selects a reliable one of the target parts 16 whose position and orientation have been estimated. If a plurality of reliable parts have been detected, a part suitable for grip is selected.

In step S704, the controller 14 performs control to calculate the driving angle of each shaft of the robot arm 11 to grip the part selected in step S703 and cause the hand 12 to grip the part.

In step S705, the controller 14 moves the part gripped in step S704 and performs desired processing. The desired processing is, for example, processing of orderly arranging the part in a predetermined orientation on a parts pallet, processing of assembling the part to another part, or processing of carrying the part to another camera or another sensor and inspecting defects. It is possible to freely set the desired processing in accordance with the requirements of the robot system.

In step S706, the controller 14 determines whether processing is completed for all parts whose position and orientation have been estimated at a predetermined reliability or more. Upon determining that processing for all parts is completed (YES in step S706), the process advances to step S707. Upon determining that processing for all parts is not completed (NO in step S706), the process returns to step S703. In step S707, the controller 14 determines whether processing is completed for all target parts 16 on the parts tray 15. This processing can be done by, for example, capturing the empty parts tray 15 in advance and calculating the difference between the image and the image of the parts tray 15 in the pile-up state captured in step S701. Alternatively, a weight sensor may be arranged under the parts tray 15. When the sensor detects a weight that is as much as that of the parts tray 15, the controller may determine that the parts tray 15 is empty. Upon determining that processing for all target parts 16 is completed (YES in step S707), the processing ends. Upon determining that processing for all target parts 16 is not completed (NO in step S707), the process returns to step S701.

According to the robot system of this embodiment, it is possible to generate a target object image for which unnecessary portions are removed in accordance with each orientation only by performing simple 2D image difference processing.

Second Embodiment

Figure 8:
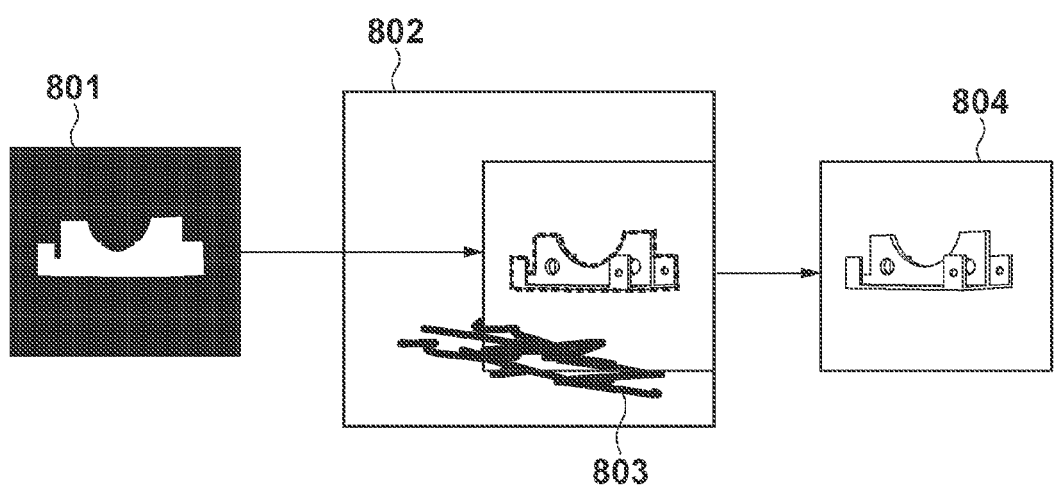
FIG. 8 is a view for explaining masking based on a part model.

Due to the influence of shadows and noise, portions other than a part may remain in a target object image generated by only the difference between a grip-state image and a non-grip-state image. In this embodiment, an arrangement will be described, which uses an orientation-specific shape mask based on a target object model to cope with the problem. An example of masking of a target object image will be explained with reference to FIG. 8. A mask pattern 801 is generated based on the outline of a part in a representative orientation 401, which is calculated by applying the 3D model of a target part 16 to the model of an image capturing apparatus 13.

In the mask pattern 801, the white portion indicates the region where the pixels are to be left, and the black portion indicates the region where the pixels are to be removed. For example, a nonvolatile mass memory 205 also functions as an orientation-specific shape mask holding unit, and stores the mask pattern 801 calculated in advance in association with the orientation.

An image 802 shows a state in which the mask pattern 801 is made to match a target object image 505 described with reference to FIG. 5, which is generated from a grip-state image and a non-grip-state image in correspondence with the representative orientation 401. A shadow 803 represents a shadow portion remaining in the target object image 505.

In this example, matching is performed using the mask pattern 801 based on the lines corresponding to the outline of the target part 16. In the target object image of the image 802, the hand portion and the other background portions are almost removed, although the influence of the shadow 803 remains. It is therefore possible to more easily make the target object image match the mask pattern 801 as compared to direct matching to the target object image 505 in FIG. 5. When the target object image is made to match the mask pattern 801 generated from the model of the target part 16, a target object image 804 in which the position and orientation of the target part 16 are specified more accurately can be cut out.

Note that in this embodiment, an example of matching using the mask and the outline has been described. Instead, the position and orientation may be made to match more accurately using an image feature amount such as an edge of the part portion of the image. In this case, cutout processing by the mask pattern 801 is performed after the position and orientation are specified using a part feature amount image generated for matching from the model.

Using the fact that the target part 16 gripped by the hand 12 is moved to a known position relative to the image capturing apparatus 13 upon generating a predetermined target object image, the mask may be directly applied to the position in the image where the target part 16 should exist without performing matching. Alternatively, the search range may be limited using the position as the initial value at the start of matching processing.

According to this embodiment, it is possible to obtain the image including only the target part because the hand portion is removed in advance based on the difference from the non-grip-state image, unlike in the case in which only masking is performed.

Third Embodiment

The illumination condition, that is, the ambient light around the robot system is not always constant. Even if the illumination that directly irradiates is constant, the condition changes in one day under an environment affected by, for example, sunlight. The condition can also change depending on the weather, the season, or an object or person in the neighborhood.

In such a case, a target object may considerably change its appearance even in the same orientation. The orientation pattern detection processing can be performed more excellently by preparing different target object images corresponding to different ambient light conditions in the same orientation and using them as learning images. In this embodiment, an example will be described, in which the robot system incorporates an ambient light condition measuring unit.

Figure 9:
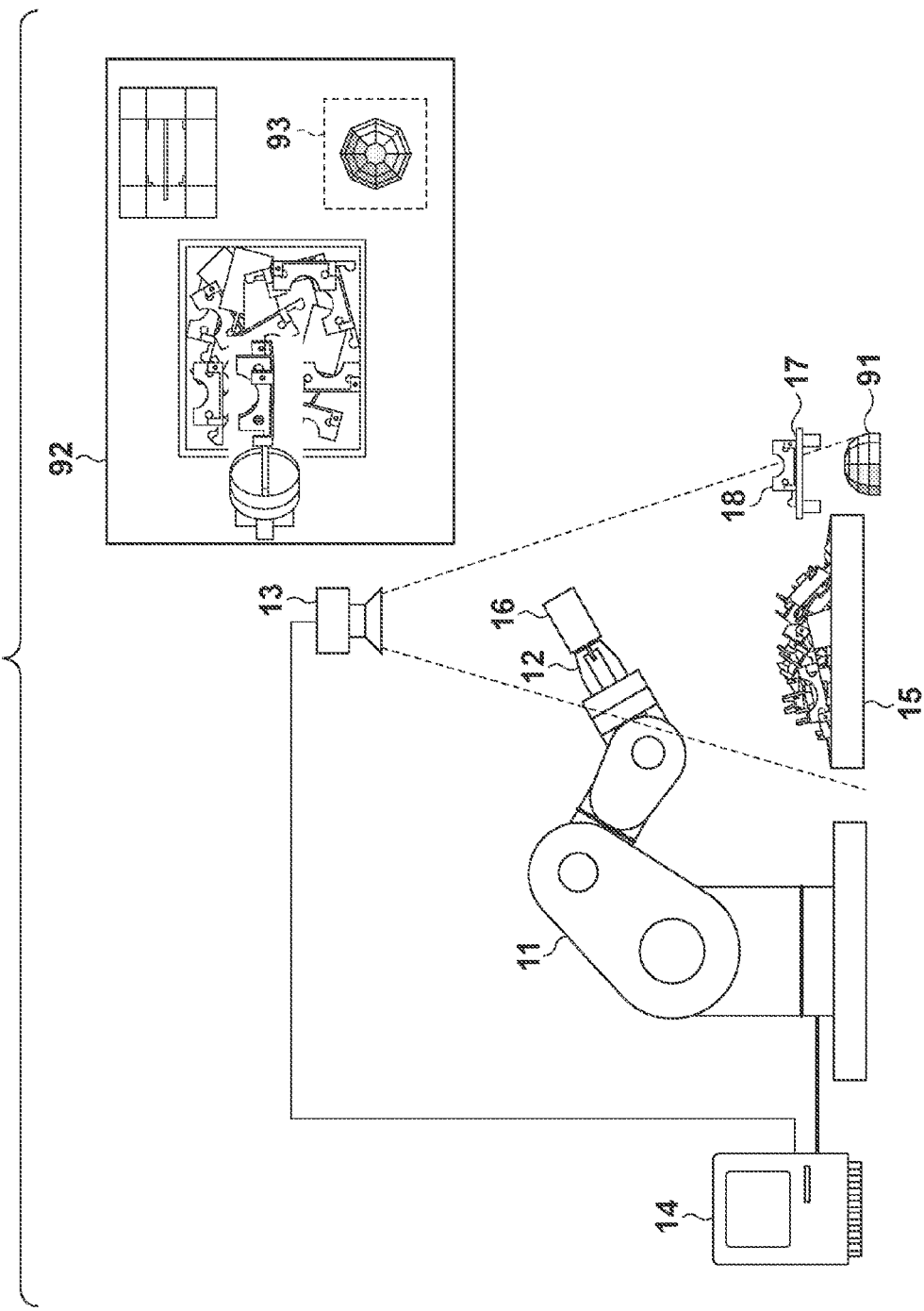
FIG. 9 is a view showing another example of the target object grip system including an ambient light condition measuring unit.

FIG. 9 shows an example of the online state of a pile-up part grip system which operates in an environment where the ambient light changes. An arm 11 to a sample part 18 in FIG. 9 are the same as those denoted by the same reference numerals in FIG. 1, and a description thereof will be omitted.

An ambient light condition measuring jig 91 functions as the ambient light condition measuring unit and is arranged within the visual field of the image capturing apparatus 13 even in the online state.

An image 92 is an example of an image including the parts tray 15 on which the target parts 16 pile up, which is captured by the image capturing apparatus 13 in the online state. The image 92 includes the ambient light condition measuring jig 91 at a position indicated by a frame 93. The ambient light condition measuring jig 91 has a solid polyhedral structure. Each plane serves as a diffuse reflector having a predetermined reflectance.

Figure 10A:
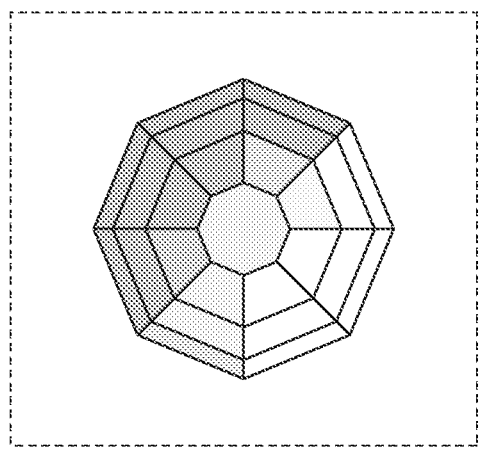
FIGS. 10A and 10B are views for explaining ambient light condition change detection processing by the ambient light condition measuring unit.
Figure 10B:
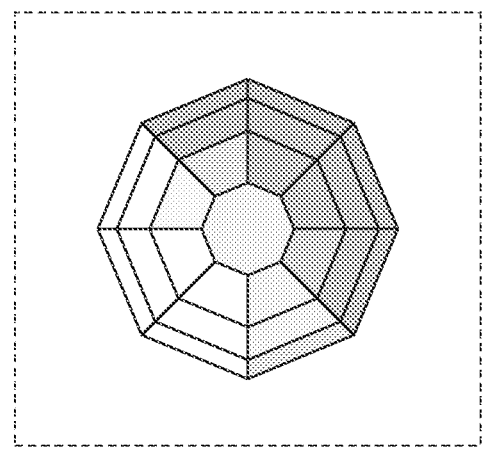

FIGS. 10A and 10B illustrate examples of images obtained by cutting out the ambient light condition measuring jig portion 93 in the image 92 at two different times. As can be seen, the ambient light condition measuring jig looks differently in FIGS. 10A and 10B due to the change in the ambient environment or sunlight. In this embodiment, the pixel difference between the two images is calculated, as in target object image generation described in the first embodiment. When a pixel difference sum s given by $$s = \sum_{x,y} (I_{h\_xy} - I_{e\_xy}) \quad (4)$$

is equal to or larger than a threshold, the controller determines that the ambient light has changed. If the sum s is smaller than the threshold, the controller determines that the ambient light conditions match.

The pixel difference sum s is calculated using an image processing circuit 204, like the target object image. In this embodiment, processing of determining the change in the ambient light condition is performed while executing processing corresponding to FIG. 7 in the online state. This processing is done before, for example, the processing in step S701. Upon detecting the change in the ambient light condition, the online operation is temporarily interrupted, and processing of obtaining a target object image corresponding to each orientation is performed, as described with reference to FIGS. 6A and 6B. In this robot system, the sample part 18 in a known orientation is always placed on the sample placement table 17 even in the online state, as shown in FIG. 9. It is therefore possible to accurately grip the sample part 18 as needed. Relearning using target object images newly obtained in correspondence with the change in the ambient light enables to implement satisfactory orientation estimation.

Orientation-specific target object images complying with the ambient light condition may be obtained in the offline state in advance to learn the orientation pattern detection processing. In the online state, the ambient light condition is measured, and the parameters learned under the same condition are read out and used. If, for example, the image of the ambient light condition measuring jig 91 corresponding to FIGS. 10A and 10B itself is stored as the ambient light condition associated with the learned parameters, whether the condition is the same can be determined as in the above-described change detection.

As described above, use of the ambient light condition measuring jig of this embodiment allows to detect the change or coincidence of the ambient light condition by very simply processing based on the pixel difference as in target object image generation.

Note that in this embodiment, the ambient light condition measuring jig 91 has a solid polyhedral structure. However, the present invention is not limited to this, as a matter of course, and for example, a hemispherical structure may be used. To attain a higher sensitivity, the jig may have a mirror surface in place of the diffuse reflector. A plurality of jigs may be prepared, and a suitable reflector may selectively be used in accordance with the target part.

Instead of using such a structure, a light sensor or the like functioning as the ambient light condition measuring unit may be used.

Alternatively, if it is obvious that the ambient light changes in accordance with the time or the like, the ambient light condition measuring jig need not always be used. In this case, the orientation-specific target object images are obtained at a predetermined time.

Fourth Embodiment

In the first embodiment, 130 representative orientations based on the geodetic dome 300 have been described. However, since the orientations of parts that pile up continuously change in fact, there are a number of intermediate orientations that do not match the 130 representative orientations. These intermediate orientations may be classified as the nearest representative orientations. However, when only the target object images for the representative orientations are used as the learning images, it is not always possible to satisfactorily estimate all the orientations.

In this embodiment, not only the images corresponding to the representative orientations themselves but also target object images for a plurality of orientations are generated as the target object images corresponding to the representative orientations by adding slight angular variations near the representative orientations. Using the target object images for the plurality of slightly varying orientations as the learning images corresponding to the representative orientations enables to implement more robust orientation pattern detection processing.

Figure 11A:
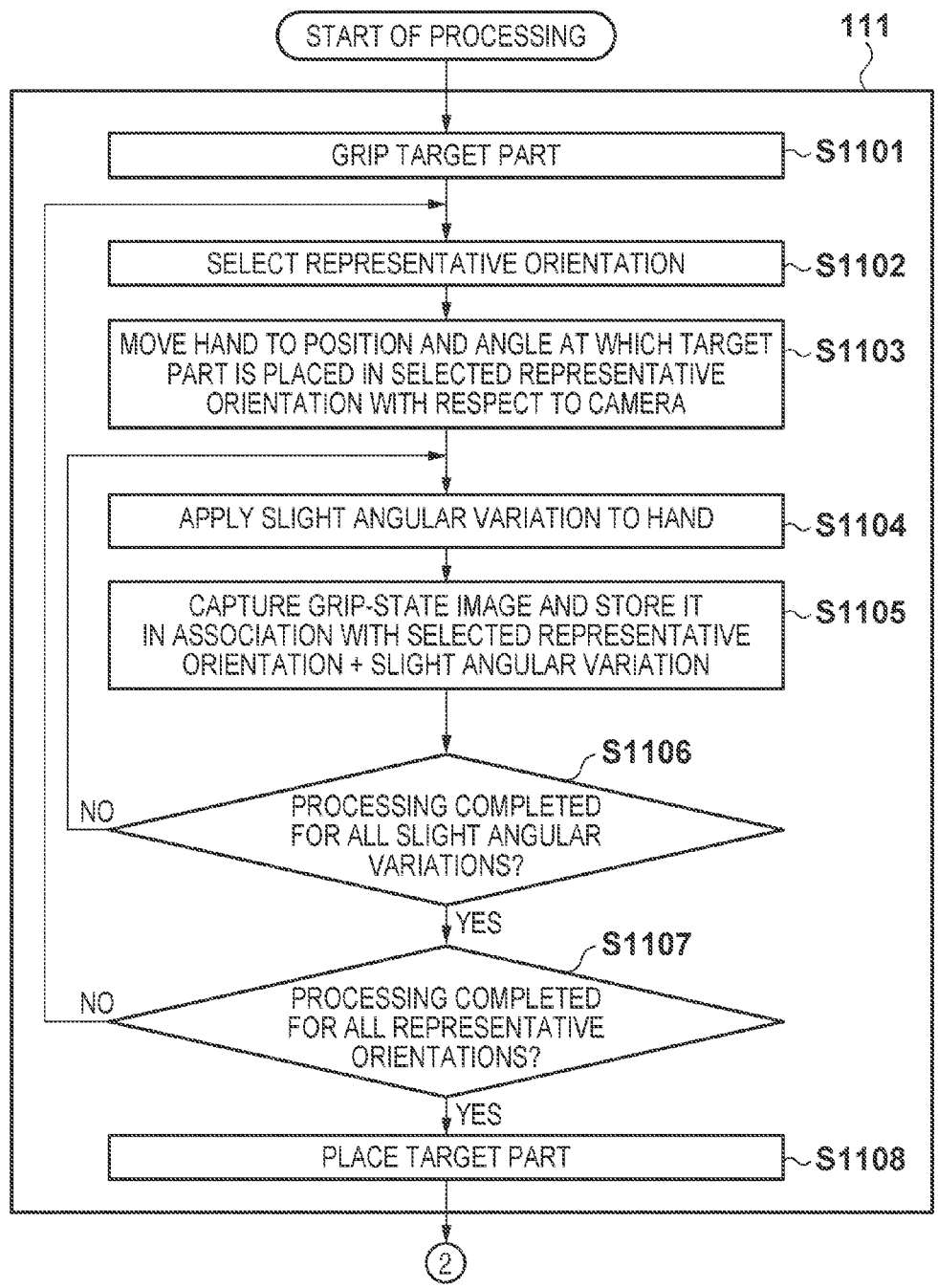
FIGS. 11A to 11C are flowcharts illustrating the procedure of processing of generating a plurality of target object images by adding slight orientation variations.
Figure 11B:
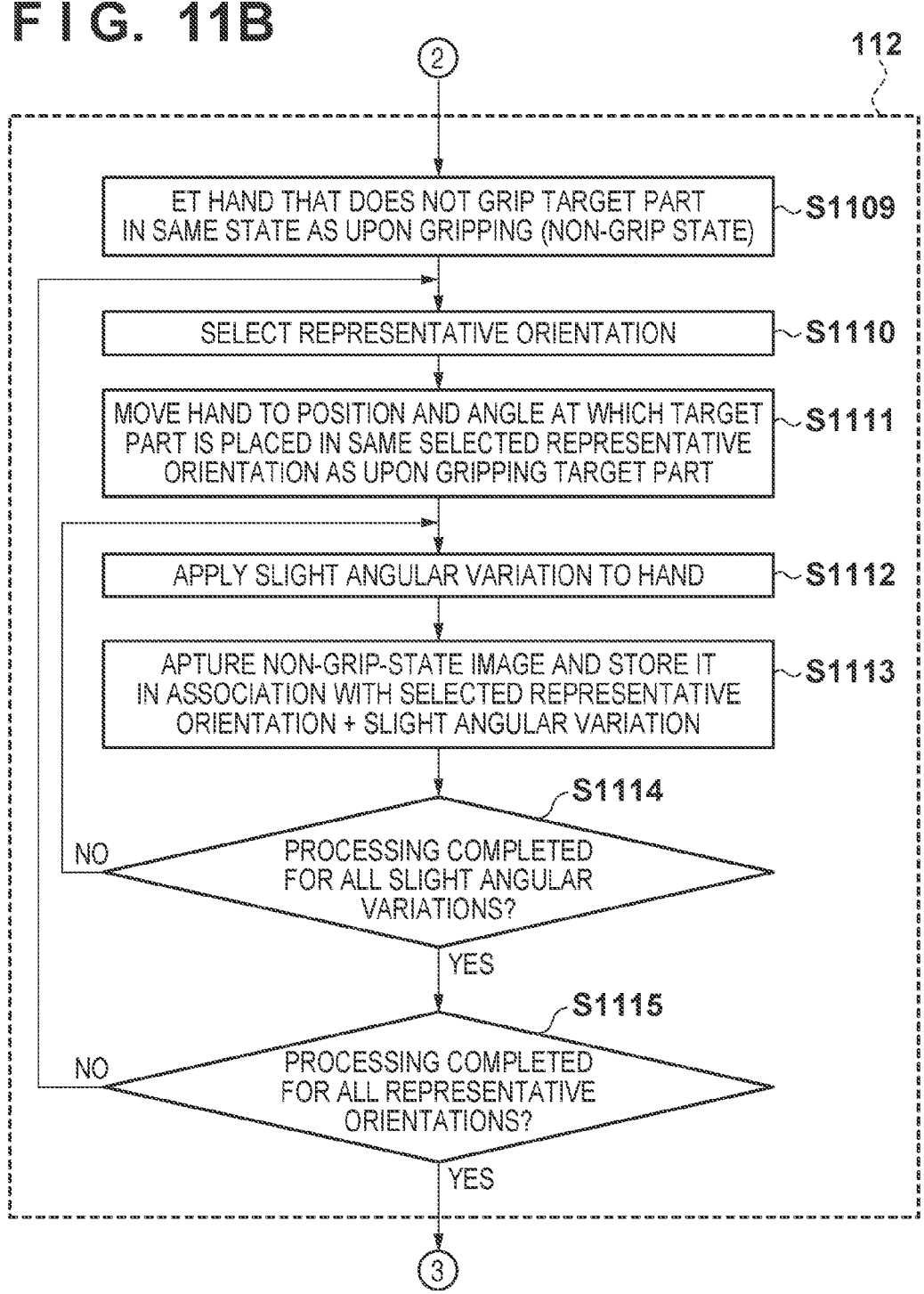
Figure 11C:
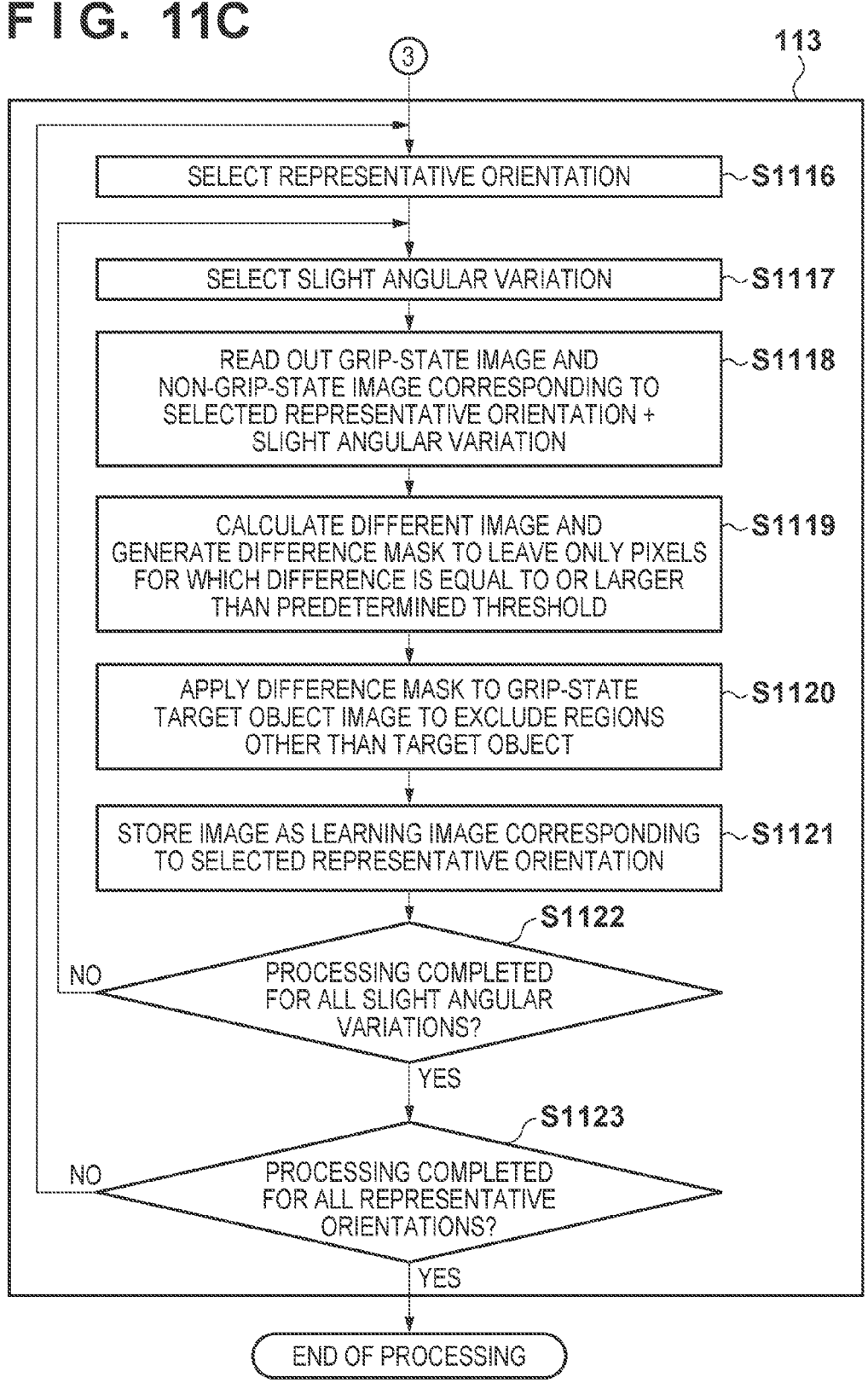

FIGS. 11A to 11C are flowcharts for explaining processing of generating a plurality of target object images by adding predetermined slight variations to the representative orientations. The processing includes processing blocks 111, 112, and 113.

The processing block 111 corresponds to the processing block 61 described with reference to FIGS. 6A and 6B, and represents processing of obtaining a grip-state image corresponding to each representative orientation. A plurality of grip-state images are obtained here by adding slight orientation variations to the representative orientations.

The processes of steps S1101 to S1103 are the same as those of steps S601 to S603 in FIGS. 6A and 6B, and a description thereof will not be repeated.

In step S1104, a controller 14 applies a slight orientation variation to a target part 16 in a selected representative orientation with respect to an image capturing apparatus 13. More specifically, the controller 14 sequentially varies at least some of the shafts of a robot arm 11 at a predetermined interval of, for example, 1° within a predetermined angular range of, for example, ±5° such that the orientation of a hand 12 gripping the target part 16 slightly changes. In this case, the controller 14 selects one of the combinations of slight variations of the shafts and rotates the hand 12.

In step S1105, the image capturing apparatus 13 captures the target object image in the grip state, as in step S604. The target object image is stored in association with the selected slight angular variation in addition to the selected representative orientation.

In step S1106, the controller 14 determines whether all the slight variation combinations of the shafts within the predetermined angular range have been selected. Upon determining that all the slight variation combinations of the shafts have been selected (YES in step S1106), the process advances to step S1107. Upon determining that not all the slight variation combinations of the shafts have been selected (NO in step S1106), the process returns to step S1104.

The processes of steps S1107 and S1108 are the same as those of steps S605 and S606, and a description thereof will not be repeated. The processes of the processing block 111 thus end, and a plurality of grip-state images with predetermined slight variations added to the representative orientations are generated.

The processing block 112 corresponds to the processing block 62 described with reference to FIGS. 6A and 6B, and represents non-grip-state image obtaining processing. A plurality of non-grip-state images are obtained here by adding slight orientation variations to the representative orientations, as in the processing block 111.

The processes of steps S1109 to S1111 are the same as those of steps S607 to S609, and a description thereof will not be repeated.

In step S1112, the controller 14 applies a slight orientation variation to the hand 12 in the non-grip state, as in step S1104. The interval and range of variation angles are the same as in step S1104. The controller 14 selects one of the combinations of shaft variations.

In step S1113, the image capturing apparatus 13 captures a non-grip-state image, as in step S610. The image is stored in association with the selected slight angular variation in addition to the selected representative orientation.

In step S1114, the controller 14 determines whether all the slight variation combinations of the shafts within the predetermined angular range have been selected, as in step S1106. Upon determining that all the slight variation combinations of the shafts have been selected (YES in step S1114), the process advances to step S1115. Upon determining that not all the slight variation combinations of the shafts have been selected (NO in step S1114), the process returns to step S1112.

The process of step S1115 is the same as that of step S611, and a description thereof will not be repeated. The processes of the processing block 112 thus end.

The processing block 113 is the same as the processing block 63 described with reference to FIGS. 6A and 6B, and represents orientation-specific target object image generation processing. A plurality of target object images are obtained here by adding slight orientation variations to the representative orientations.

The process of step S1116 is the same as that of step S612, and a description thereof will not be repeated.

In step S1117, the controller 14 selects one of the combinations of shaft variations for the same interval and range of variation angles as those selected in steps S1104 and S1112. In step S1118, the controller 14 reads out the grip-state image and the non-grip-state image stored in association with the slight variation in addition to the selected representative orientation.

The processes of steps S1119 and S1120 are the same as those of steps S614 and S615, and a description thereof will not be repeated.

In step S1121, the controller 14 associates the generated target object image as one of the target object images of the selected representative orientation and stores it in a nonvolatile mass memory 205.

In step S1122, the controller 14 determines whether all the slight variation combinations of the shafts within the predetermined angular range have been selected, and target object image generation is completed, as in steps S1106 and S1114. Upon determining that all the slight variation combinations of the shafts have been selected, and target object image generation is completed (YES in step S1122), the process advances to step S1123. Upon determining that not all the slight variation combinations of the shafts have been selected, and target object image generation is not completed (NO in step S1122), the process returns to step S1117.

The process of step S1123 is the same as that of step S617, and a description thereof will not be repeated. The processes of the processing block 113 thus end, and the entire processing illustrated by the flowchart of FIGS. 11A to 11C ends.

According to this embodiment, target object images can be generated by adding a plurality of slight orientation variations to the representative orientations. Using the images as learning data for orientation pattern detection processing of each representative orientation allows improvement to be expected of detection performance for an arbitrary orientation.

Note that the present invention is not limited to the above-described specific embodiments, and various changes and modifications can be made within the spirit and scope of the present invention described in the appended claims. For example, the present invention is applicable not only to the production robot system but also to various kinds of robot systems such as a household robot.

According to the present invention, it is possible to generate image data including only a target object by removing unnecessary portions such as a hand by simple processing from a 2D image obtained by capturing the target object gripped by a hand mechanism while changing its orientation.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-252208, filed on Nov. 10, 2010, which is hereby incorporated by reference herein in its entirety.

What is claimed is:

1. An image generation apparatus comprising:
a grip unit configured to grip a target object by a hand with a plurality of fingers;
an image capturing unit configured to capture an image of at least one of the target object and said grip unit;
an image processing unit configured to process an image; and
a grip controller configured to control said grip unit; and
an image capturing controller configured to control said image capturing unit,
wherein said image capturing controller controls said image capturing unit to capture, as a grip-state image for a predetermined orientation, said grip unit and the target object when said grip controller controls said grip unit to grip the target object by the hand in a grip state and place the target object in the predetermined orientation relative to said image capturing unit,
wherein the image capturing controller stores the orientation and position of the hand in the grip state,
wherein said image capturing controller controls said image capturing unit to capture, as a non-grip-state image for the predetermined orientation, said grip unit when said grip controller controls said grip unit not to grip the target object, to be in the stored position and orientation that are coincident with the position and orientation in which said grip unit gripped and placed the target object in the predetermined orientation, and to be positioned and oriented in the same way of opening the fingers of the hand when said grip unit gripped the target object by the hand, and
wherein said image processing unit generates the target object image representing the target object in the predetermined orientation based on a difference between the grip-state image for the predetermined orientation and the non-grip-state image for the predetermined orientation.

2. The apparatus according to claim 1, wherein said grip controller controls said grip unit to grip the target object and to continuously change the predetermined orientation of the target object, and said image capturing controller controls said image capturing unit to capture the target object and said grip unit for a plurality of changed predetermined orientations, and
wherein said grip controller controls said grip unit not to grip the target object and to continuously change the form coincident with the form in which said grip unit gripped and placed the target object in each of the changed predetermined orientations, and said image capturing controller controls said image capturing unit to capture the target object for the plurality of changed predetermined orientations.

3. The apparatus according to claim 1, wherein said image processing unit generates the target object image for the predetermined orientation under a plurality of different ambient light conditions.

4. The apparatus according to claim 3, wherein said image processing unit detects a change in the ambient light condition, and
wherein said image capturing unit captures the target object image when the change in the ambient light condition is detected by said image processing unit.

5. The apparatus according to claim 4, wherein said image processing unit detects the change in the ambient light condition based on images obtained by causing said image capturing unit to capture a structure arranged within an image capturing range of said image capturing unit at a plurality of points of time.

6. The apparatus according to claim 1, further comprising a holding unit configured to hold the target object in a known orientation,
wherein said grip unit grips the target object held by said holding unit.

7. The apparatus according to claim 1, wherein said grip controller controls said grip unit to add a predetermined orientation variation to the predetermined orientation of the target object, and
wherein said image capturing controller controls said image capturing unit to capture an image of at least one of the target object and said grip unit for a plurality of orientations obtained by adding the orientation variation to the predetermined orientation.

8. The apparatus according to claim 1, wherein said image processing unit generates a mask pattern based on a difference between the grip-state image and the non-grip-state image, and masks the grip-state image using the mask pattern to obtain the target object image.

9. The apparatus according to claim 1, wherein said grip controller controls said grip unit to grip the target object at different grip positions to place the target object in the predetermined orientation, and
wherein said image processing unit generates the target object image based on grip-state images and the non-grip-state images corresponding to the different grip positions.

10. An image generation method of an image generation apparatus including a grip unit for gripping a target object by a hand with a plurality of fingers and an image capturing unit, the image generation method comprising:
capturing the grip unit and a target object, by the image capturing unit, as a grip-state image for a predetermined orientation, when the grip unit is controlled to grip the target object by the hand in a grip state and place the target object in a predetermined orientation relative to the image capturing unit;
storing in a memory the orientation and position of the hand in the grip state;
capturing the grip unit, as a non-grip-state image for the predetermined orientation, when the grip unit is controlled not to grip the target object, to be in the stored position and orientation that are coincident with the position and orientation in which said grip unit gripped and placed the target object in the predetermined orientation, and to be positioned and oriented in the same way of opening the fingers of the hand when said grip unit gripped the target object by the hand; and
generating a target object image representing the target object for the predetermined orientation based on a difference between the grip-state image for the predetermined orientation and the non-grip-state image for the predetermined orientation.

11. A computer-readable non-transitory storage medium storing a computer program that causes a computer to execute each step of an image generation method of claim 10.

12. The apparatus according to claim 1, wherein the predetermined orientation is one of a plurality of representative orientations defined by directions viewed from respective representative points on a geodetic dome to the target object arranged at a center of the geodetic dome.

* * * * *